(12) United States Patent
Yoshida et al.

(10) Patent No.: US 7,821,522 B2
(45) Date of Patent: Oct. 26, 2010

(54) IMAGE PROCESSING APPARATUS AND IMAGE DISPLAY APPARATUS USING SAME

(75) Inventors: Yasuhiro Yoshida, Nara (JP); Hiroyuki Furukawa, Ueno (JP)

(73) Assignee: Sharp Kabushiki Kaisha, Osaka (JP)

( * ) Notice: Subject to any disclaimer, the term of this patent is extended or adjusted under 35 U.S.C. 154(b) by 1118 days.

(21) Appl. No.: 11/245,686

(22) Filed: Oct. 7, 2005

(65) Prior Publication Data

US 2006/0028484 A1 Feb. 9, 2006

Related U.S. Application Data

(63) Continuation of application No. 09/815,594, filed on Mar. 23, 2001, now Pat. No. 7,002,594.

(30) Foreign Application Priority Data

Mar. 24, 2000 (JP) ............................... 2000-84663
Jan. 22, 2001 (JP) ............................... 2001-13864

(51) Int. Cl.
G09G 5/02 (2006.01)
(52) U.S. Cl. ....................... 345/600; 348/624
(58) Field of Classification Search ................ 345/600, 345/102; 348/607, 624
See application file for complete search history.

(56) References Cited

U.S. PATENT DOCUMENTS

| | | | |
|---|---|---|---|
| 4,962,419 A | 10/1990 | Hibbard et al. | |
| 5,140,424 A | 8/1992 | Yoshimura et al. | |
| 5,359,342 A | 10/1994 | Nakai et al. | |
| 5,557,340 A | 9/1996 | Millward | |
| 5,691,821 A | 11/1997 | Hieda et al. | |
| 5,696,710 A | 12/1997 | Hague et al. | |
| 6,040,876 A * | 3/2000 | Pettitt et al. | 348/624 |
| 6,052,491 A | 4/2000 | Clatanoff et al. | |
| 6,181,819 B1 | 1/2001 | Arimoto et al. | |
| 6,215,913 B1 | 4/2001 | Clatanoff et al. | |
| 6,300,931 B1 * | 10/2001 | Someya et al. | 345/102 |
| 6,343,147 B2 | 1/2002 | Yamamoto | |
| 6,441,867 B1 * | 8/2002 | Daly | 348/607 |
| 6,724,437 B2 | 4/2004 | Funke et al. | |

(Continued)

FOREIGN PATENT DOCUMENTS

DE 299 10 177 11/1999

(Continued)

*Primary Examiner*—Amare Mengistu
*Assistant Examiner*—Yuk Chow
(74) *Attorney, Agent, or Firm*—Edwards Angell Palmer & Dodge LLP; David G. Conlin; Catherine J. Toppin

(57) ABSTRACT

An image processing apparatus of the present invention comprising (a) a first signal processing circuit for applying gamma correction to an n-bit (n: a natural number) digital signal inputted as a video signal and for converting the n-bit digital signal into an m-bit (m>n, m: a natural number) digital signal, and (b) a second signal processing circuit for adding a noise signal, which is used for pseudo contour reduction, into the m-bit digital signal from the first signal processing circuit and for outputting a Q-bit (Q: a natural number) digital signal, which is obtained from rounding off a less significant (m−Q) bit (Q≦n) from the m-bit digital signal, to a display section.

8 Claims, 11 Drawing Sheets

U.S. PATENT DOCUMENTS

| | | |
|---|---|---|
| 6,943,836 B2 | 9/2005 | Kitagawa |
| 6,965,389 B1 | 11/2005 | Masuji et al. |
| 2001/0008429 A1 | 7/2001 | Arimizu |

FOREIGN PATENT DOCUMENTS

| | | |
|---|---|---|
| EP | 0 427 524 | 5/1991 |
| EP | 0 662 774 | 7/1995 |
| EP | 0 883 103 | 12/1998 |
| EP | 0 981 127 | 2/2000 |
| JP | 02-271390 | 11/1990 |
| JP | 03-018822 | 1/1991 |
| JP | 03-185515 | 8/1991 |
| JP | 05-064103 | 3/1993 |
| JP | 05-216430 | 8/1993 |
| JP | 06-230760 | 8/1994 |
| JP | 08-046897 | 2/1996 |
| JP | 08-227283 | 9/1996 |
| JP | 09-016756 | 1/1997 |
| JP | 09-018723 | 1/1997 |
| JP | 09-185707 | 7/1997 |
| JP | 11-008769 | 1/1999 |
| JP | 11-015444 | 1/1999 |
| JP | 11-065537 | 3/1999 |
| JP | 11-249628 | 9/1999 |
| JP | 2000-075845 | 3/2000 |
| JP | 2000-148068 | 5/2000 |

* cited by examiner

F I G. 8
F I G. 9
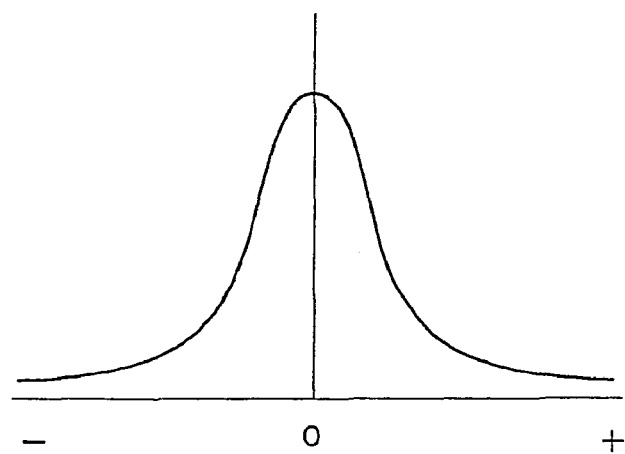

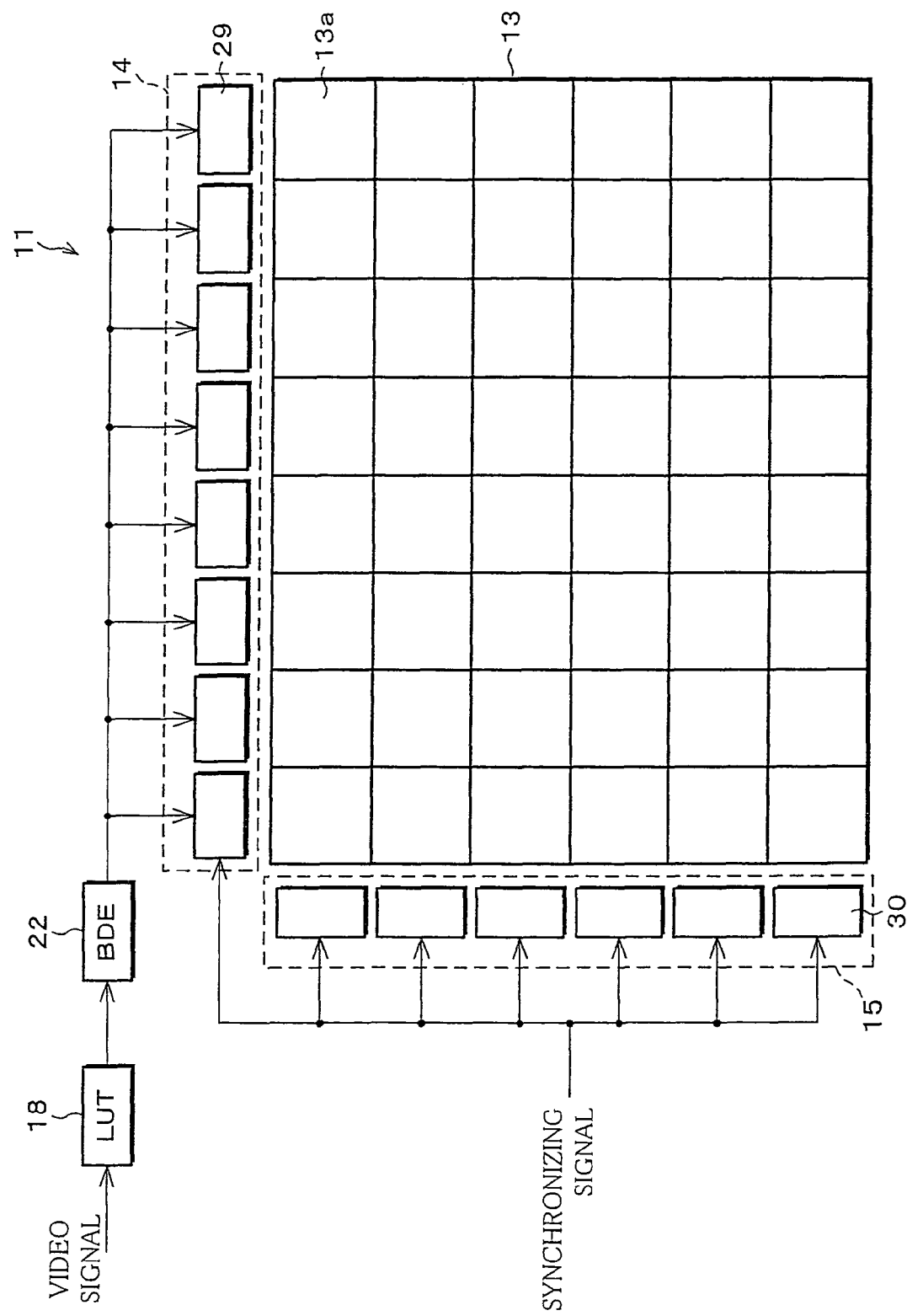

IMAGE PROCESSING APPARATUS AND IMAGE DISPLAY APPARATUS USING SAME

FIELD OF THE INVENTION

The present invention relates to an image processing apparatus, in which a digital signal is inputted as a video signal, for use in a digital image display apparatus for displaying a digital image, and an image display apparatus provided with the image processing apparatus.

BACKGROUND OF THE INVENTION

Conventionally, gamma correction is usually applied to a digital video signal inputted into a digital image display apparatus in order to improve display properties to the level of that of Cathode Ray Tube (CRT) apparatus.

However, pseudo contour is caused on the display image when inputting the gamma-corrected video signal into the digital image display apparatus without any treatment, thus resulting in lower display quality.

Therefore, for example, disclosed in Japanese Unexamined Patent Publication Tokukaihei No. 9-185707 (published on Jul. 15, 1997) is technology for reducing the pseudo contour due to the gamma correction. The technology employs signal processing technology in which error diffusion method is applied, in other words, the gamma correction, which is a vital process for a spatial light modulator and a display apparatus with linear luminescence properties, is carried out by random addition of a controlled noise signal into the video signal.

However, in the error diffusion method disclosed in the publication, the noise signal, which is to be added to the video signal, is stored and fed back in order to prevent accumulation of errors. The apparatus is complicated due to the additional need for a memory, which is used for storing the noise signal, and for a circuit to feed back. Consequently, a high cost is a problem.

SUMMARY OF THE INVENTION

An object of the present invention is to provide, at a low cost, an image processing apparatus that may achieve reduction of pseudo contour, which is generated by gamma correction, by using a simple circuit structure, and to provide an image display apparatus provided with the image processing apparatus.

The image processing apparatus of the present invention is, for the purpose of achieving the object, utilized for an image display apparatus that is provided with display apparatus having display properties of n bit (n: a natural number) for displaying an image, when accepting a digital signal as a video signal, in accordance with the digital signal. The image processing apparatus is provided with a first signal processing circuit and a second signal processing circuit. The first signal processing circuit carries out the gamma correction for an n-bit digital signal inputted as the video signal, and converts the digital signal into an m-bit (m>n, m: a natural number) digital signal. The second signal processing circuit adds a noise signal, which reduces the pseudo contour, to the m-bit digital signal from the first signal processing circuit, then outputs a Q-bit (Q: a natural number) digital signal, which is obtained by rounding down a less significant (m−Q) bit (Q≦n) from the m-bit digital signal, to the above display apparatus.

Therefore, the inputted n-bit digital signal is expanded to the m-bit digital signal after the gamma correction. Next, the noise signal for reducing the pseudo contour is added to the m-bit digital signal, which is converted into the Q-bit digital signal by rounding down the less significant (m−Q) bit from the m-bit digital signal. Then, the n-bit digital signal is inputted into the display apparatus of Q-bit display properties.

Hence, the digital signal without the bit lack is inputted into the display apparatus. In other words, the display apparatus having 8-bit display properties receives the 8-bit digital signal.

Moreover, a radical change in thickness of the color of adjacent pixels to be displayed is prevented by adding the noise signal, which reduces the pseudo contour, into the m-bit digital signal. The m-bit digital signal has become a video signal with no or little pseudo contour generation.

Next, the less significant (m−Q) bit of the m-bit digital signal with no or little pseudo contour generation is rounded off to convert the m-bit digital signal into the Q-bit digital signal whose bit number is the same as the display properties of the display apparatus. The Q-bit digital signal has become a video signal in which the thickness of the color of the adjacent pixels of the image to be displayed is not radically changed, in other words, no pseudo contour is generated.

Therefore, a display image of high quality with no or little pseudo contour may be achieved by inputting this Q-bit digital signal into the display apparatus having Q-bit display properties.

In order to achieve the above object, the image processing apparatus of the present invention is provided with a signal processing circuit for outputting the Q-bit digital signal, which is obtained by rounding down the less significant (m−Q) bit (Q<m, m & Q: natural numbers) from the m-bit digital signal after adding the noise signal for reducing the pseudo contour into the inputted m-bit digital signal.

Because the less significant (m−Q) bit is rounded off after the addition of the noise signal into the m-bit digital signal, it is not the thin out of the less significant (m−Q) bit. Thus, it is possible that the display properties equivalent to m bit are expressed in a pseudo manner by the Q-bit digital signal.

Set to zero is the average value of the signal level of the noise signal to be added into the m-bit digital signal. Accumulation of errors of signals due to the noise signal addition will not be caused by adding a noise signal, which is in the above setting, into the digital signal in a random manner.

This may simplify the apparatus, thus offers a low-cost image processing apparatus, because some apparatus such as a memory and a feedback circuit are no longer necessary, which are needed in the conventional error diffusion method for preventing the accumulation of errors when a noise signal is added into a digital signal.

For a fuller understanding of the nature and advantages of the invention, reference should be made to the ensuing detailed description taken in conjunction with the accompanying drawings.

BRIEF DESCRIPTION OF THE DRAWINGS

FIG. 2 (b) is a graph illustrating a relation between an input value and an output value in the first signal processing section shown in FIG. 2 (a).

FIG. 8 is an explanatory view showing a random noise signal.

FIG. 9 is a histogram showing frequency distribution of levels of the noise signal shown in FIG. 8.

FIG. 10 (a) is a graph illustrating a relation between a signal level of the input signal and the transmittance of the LCD. FIG. 10 (b) is a graph explaining a relation between a signal level of an R (Red) signal among the output signals and the transmittance of the LCD. FIG. 10 (c) is a graph showing a relation between a signal level of a G (Green) signal among the output signals and the transmittance of the LCD. FIG. 10 (d) is a graph illustrating a relation between a signal level of a B (Blue) signal among the output signals and the transmittance of the LCD.

FIG. 12 is an explanatory diagram showing how a video signal and a synchronizing signal fed into driving IC, which is used by a display section of the image display apparatus shown in FIG. 11, are inputted.

DESCRIPTION OF THE EMBODIMENTS

Described below is the explanation of one embodiment of the present invention. It should be noted that a Liquid Crystal Display (LCD) apparatus will be discussed as the image display apparatus in the present embodiment.

Figure 1:
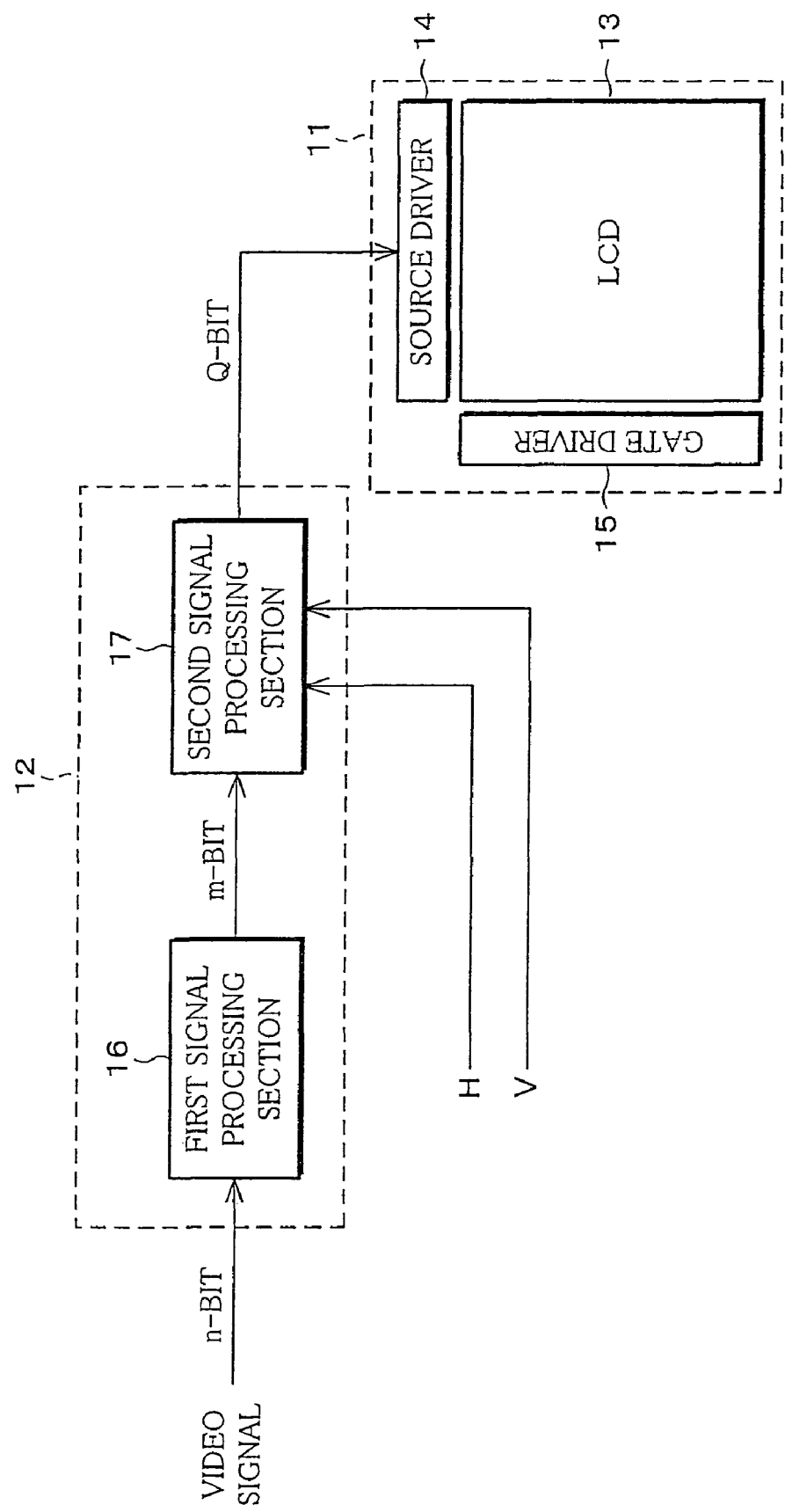
FIG. 1 is a schematic view showing a schematic structure of an image display apparatus provided with an image processing apparatus of the present invention.

The LCD apparatus in the present embodiment is, as shown in FIG. 1, provided with a display section 11 as display means for displaying an image in accordance with a video signal, and an image processing apparatus 12 for processing the video signal in accordance with the display properties of the display-section 11.

The display section 11 includes an LCD 13, which has display properties of Q bit (Q: a natural number), that is, has tone gradation of $2^Q$ (the Qth power of 2), and a source driver 14 and a gate driver 15 as drive means for driving the LCD 13.

The source driver 14, upon receipt of a video signal that has been processed by the image processing apparatus 12, sends a voltage, which varies depending on the inputted video signal, to a source electrode line (not shown) of the LCD 13.

On the other hand, the gate driver 15, upon receipt of synchronizing signals (Horizontal Synchronizing Signal H, Vertical Synchronizing Signal V) that have been outputted from a synchronizing signal generating circuit (not shown), sends a voltage, which varies depending on the inputted synchronizing signals, to a gate electrode line (not shown).

The image processing apparatus 12 is provided with a first signal processing section (a First Signal Processing Circuit) 16 and a second signal processing section (a Second Signal Processing Circuit) 17. The first signal processing section 16 has bit converting means that applies gamma correction to an n-bit (n: a natural number) digital signal inputted as a video signal, and converts the digital signal into an m-bit (m>n, m: a natural number) digital signal, then outputs the digital signal. The second signal processing section 17 converts the m-bit digital signal, which is forwarded from the first signal processing section 16, into a Q-bit (Q: a natural number) digital signal by rounding down the m bit below a less significant (m−Q) bit (Q≦n).

Therefore, the bit number Q of the digital signal inputted into the source driver 14 of the display section 11 is equal or less than n-bit number that is inputted in.

As the result, the display quality of display image may be significantly improved in the LCD apparatus in the above-mentioned arrangement by avoiding pseudo contour generation, which is caused by the bit lack occurred at the gamma correction of a video signal.

In the following explanation, the values of those natural numbers, namely n, m, and Q, are supposed to be n=8, m=10 and Q=8, respectively. Thus, the LCD 13 will be described as a display apparatus with display properties of Q=8 bits. In the image processing apparatus 12, it is supposed that the first signal processing section 16 converts an n-bit, that is, 8-bit digital signal into an m-bit, that is, 10-bit digital signal by expanding bit numbers from 8 (N) to 10 (M) then the second signal processing section 17 converts the m-bit, that is, 10-bit digital signal to a Q-bit, that is, 8-bit digital signal by rounding down less significant 2 bits (m−Q) from the m-bit digital signal.

The image processing apparatus 12 is discussed below.

To begin with, the signal processing made by the first signal processing section 16 in the image processing apparatus 12 is explained below, referring to FIG. 2 through FIG. 5. Note that, the LCD 13 of the display section 11 is made of liquid crystals of normally white mode, in which its transmittance is decreased as the applied voltage is increased at the display electrode.

Figure 2:
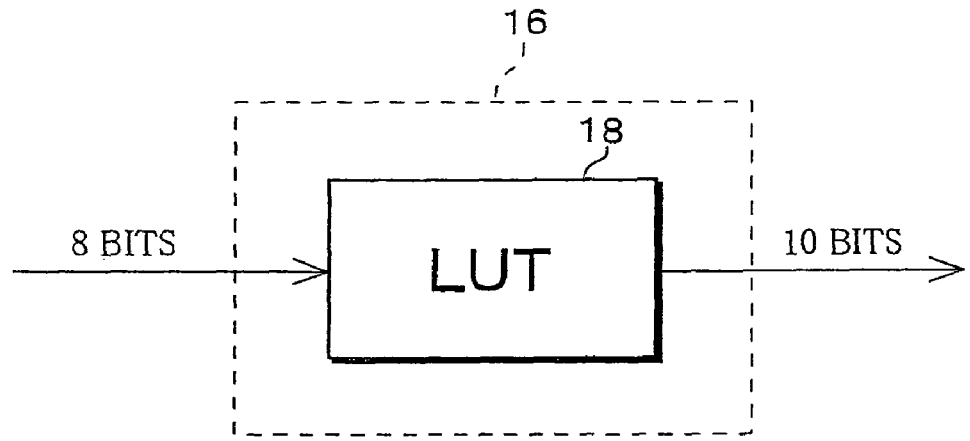
FIG. 2 (a) is a schematic view showing a schematic structure of a first signal processing section provided in the image processing apparatus shown in FIG. 1.
Figure 2:
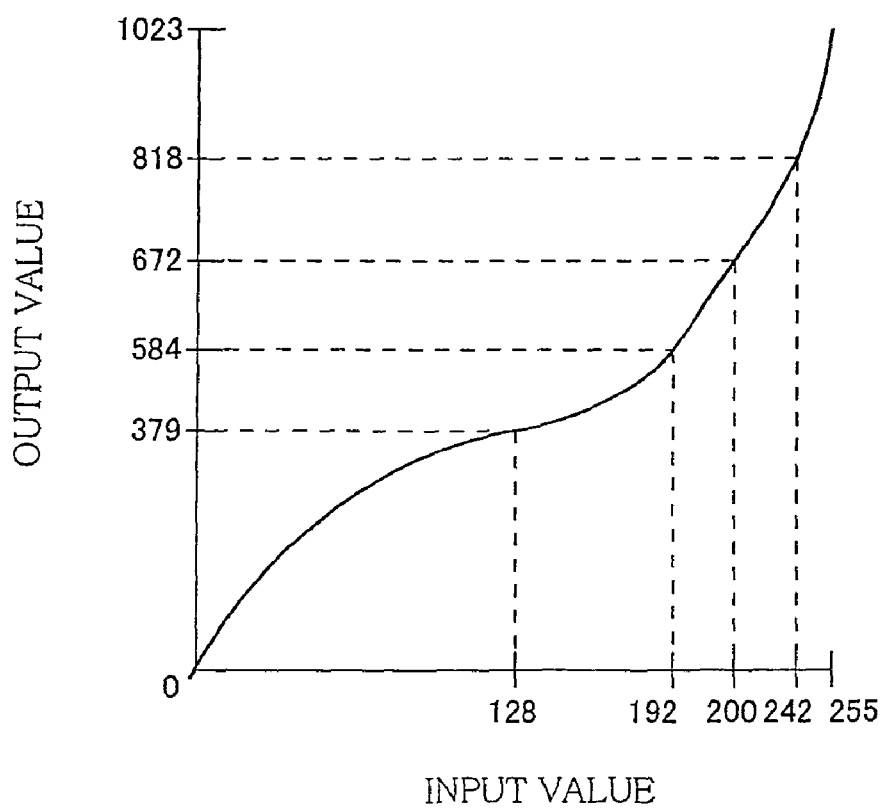

The first signal processing section 16 is, as shown in FIG. 2 (a), provided with a Look Up Table (LUT) 18 as bit converting means to carry out the gamma correction of an inputted 8-bit digital signal and the conversion of the digital signal into a 10-bit digital signal. In other words, the LUT 18 is, as shown in FIG. 2 (b), provided for converting the signal level (input value) of the 8-bit digital signal into the corresponding signal level (output value) of the 10-bit digital signal.

The setting of the output value of the LUT 18 is explained below, with reference to FIG. 3 through FIG. 5.

Figure 3:
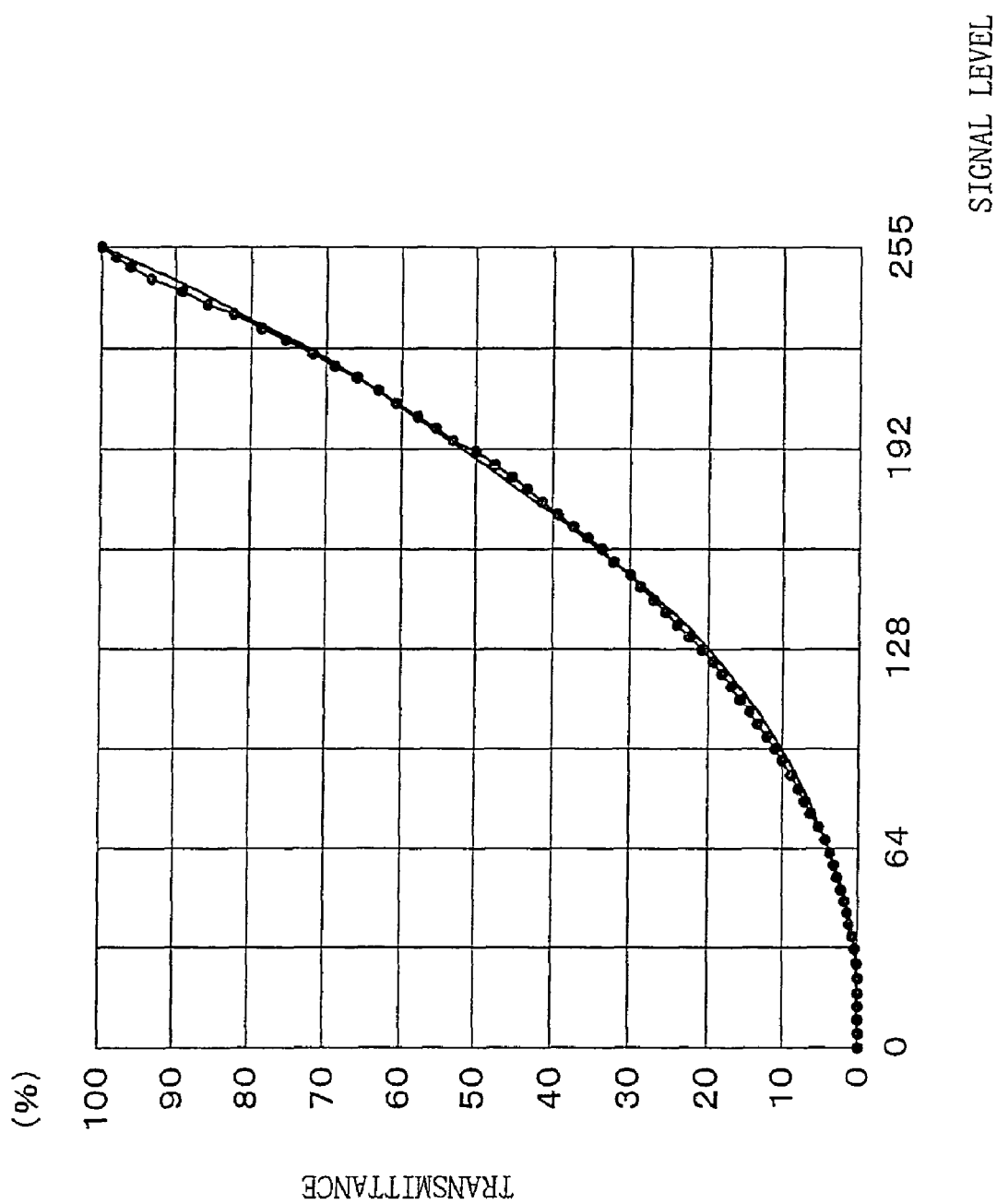
FIG. 3 is a graph showing a relation between a signal level and transmittance of the input signal of the first signal processing section shown in FIG. 2.
Figure 4:
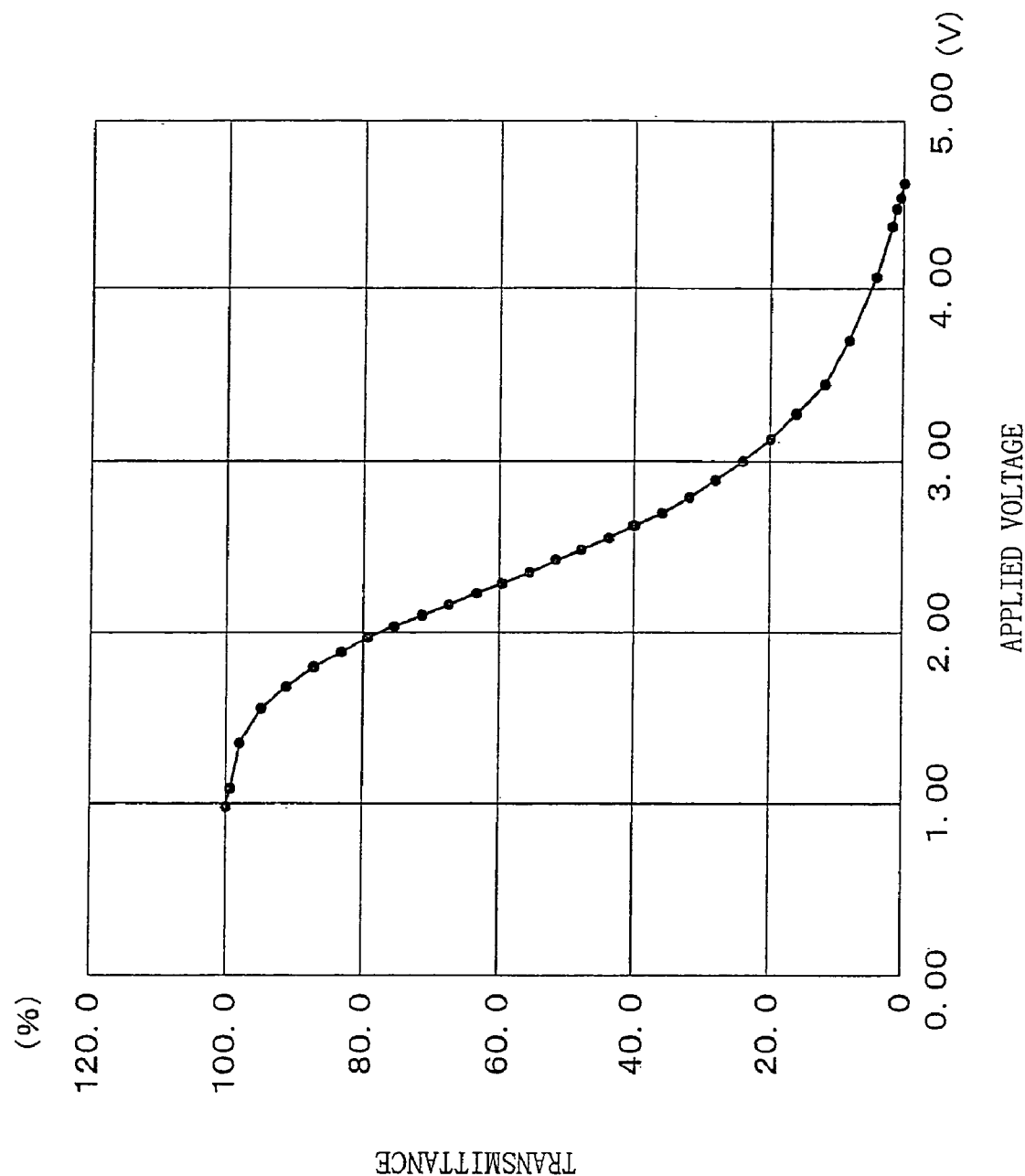
FIG. 4 is a graph showing display properties of a Liquid Crystal Display (LCD) of a display section provided to the image display apparatus shown in FIG. 1.

FIG. 3 is a graph illustrating a relation between the signal level of the inputted 8-bit digital signal and the transmittance of the LCD 13 under the condition of gamma=2.2, which is commonly used for television systems. FIG. 4 is a graph showing a relation between the voltage applied to the electrode of the LCD 13 and the transmittance of the LCD 13 in order to explain the display properties of the LCD 13. Moreover, FIG. 5 is a graph showing a relation between the transmittance of the LCD 13 and the signal level of the digital signal when the 8-bit digital signal is converted into the 10-bit digital signal as shown in FIG. 2 (b).

Figure 5:
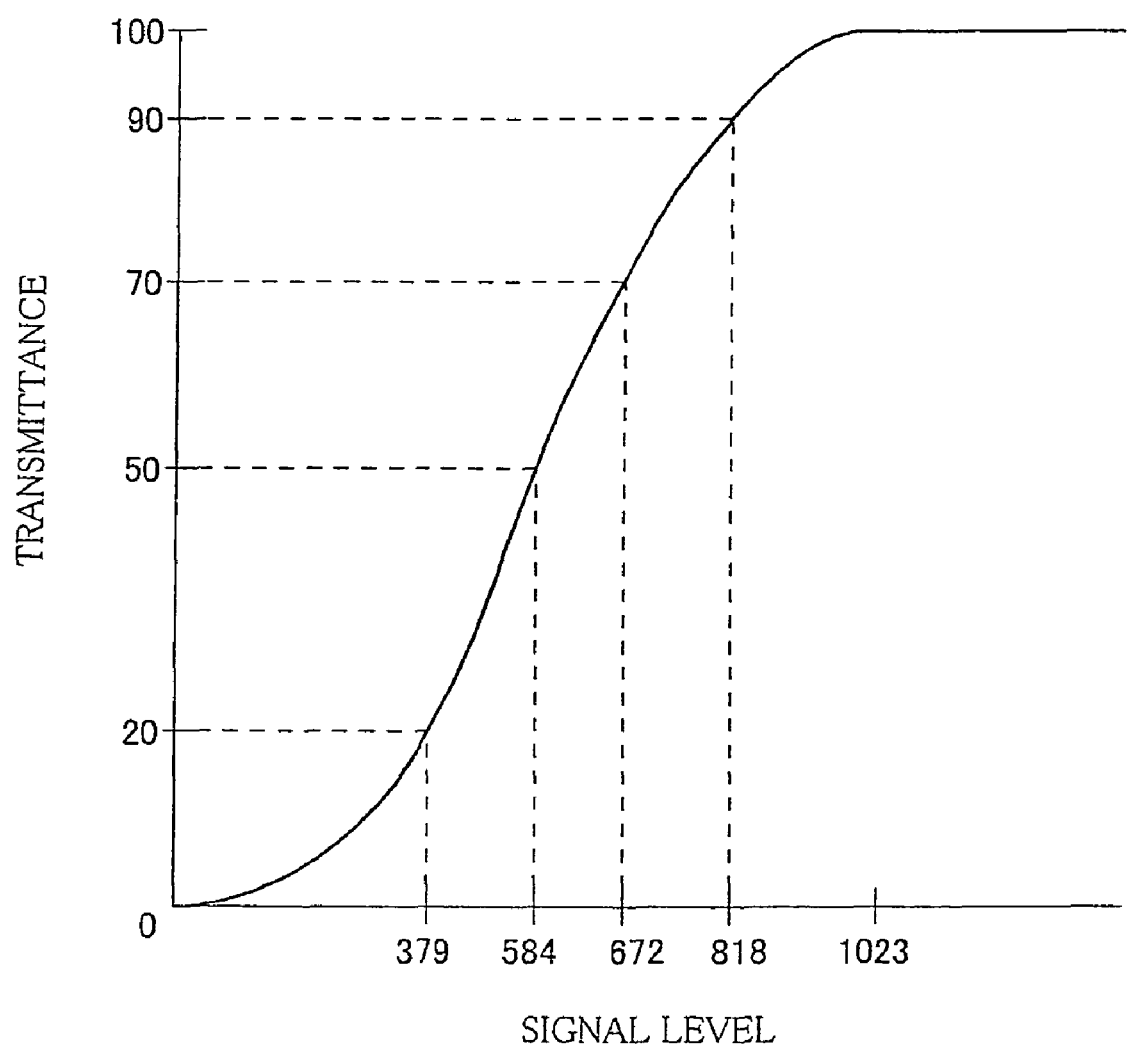
FIG. 5 is a graph illustrating a relation between a signal level and transmittance of the output signal of the first signal processing section shown in FIG. 2.

The graph in FIG. 5 is prepared in the following manner. According to FIG. 4, the transmittance is 100% at applied voltage of 1.00 V. The signal level of the inputted digital signal in this condition is 1023, while the signal level of the inputted digital signal will be lowered to 0 when the transmittance is 0% at applied voltage of 4.50 V. Similarly, the transmittance of 50% at 2.50 V applied voltage gives a signal level of 584, which is calculated from a formula: (1023−(2.50−1.00)/(4.50−1.00)×1024). Accordingly, the signal level will be 379 with 20% transmittance at 3.20 V applied voltage, 672 with 70% transmittance at 2.20 V applied voltage, and 818 with 90% transmittance at 1.70 V applied voltage.

Here, the signal level is indicative of the tone gradation of the video signal. Therefore, the scale of axis of abscissa in FIG. 3 is 0 to 255 because 8 bits have a gradation of $2^8=256$, while that scale in FIG. 5 is 0 to 1023 since the gradation is 210=1024 for 10 bits.

FIG. 2 (b) is provided for correlating FIG. 5 and FIG. 3 obtained in the manner mentioned above. For example, with 50% transmittance, the input level is 192 according to FIG. 3, while the value for 10 bits is 584 according to FIG. 5. Thus, FIG. 2 (b) is the graph for converting the input with the input value of 192 to the output value of 584. Similarly, the graph shows the conversion of other values as follows: from input value 128 to output value 379 at 20% transmittance, from input value 220 to output value 672 at 70% transmittance and from input value 242 to output value 818 at 90% transmittance.

FIG. 2 (b) is prepared by calculating the correlation for all the levels in this manner.

The digital signal, which was inputted in 8 bits, is converted into the 10-bit digital signal by using the LUT 18 where its output value has been determined in the way discussed above. A relation between the signal level of the 10-bit digital signal after the conversion and the transmittance of the LCD 13 gives the graph shown in FIG. 5.

Described below is an explanation on the signal processing of the second signal processing section 17 in the image processing apparatus 12.

Figure 6:
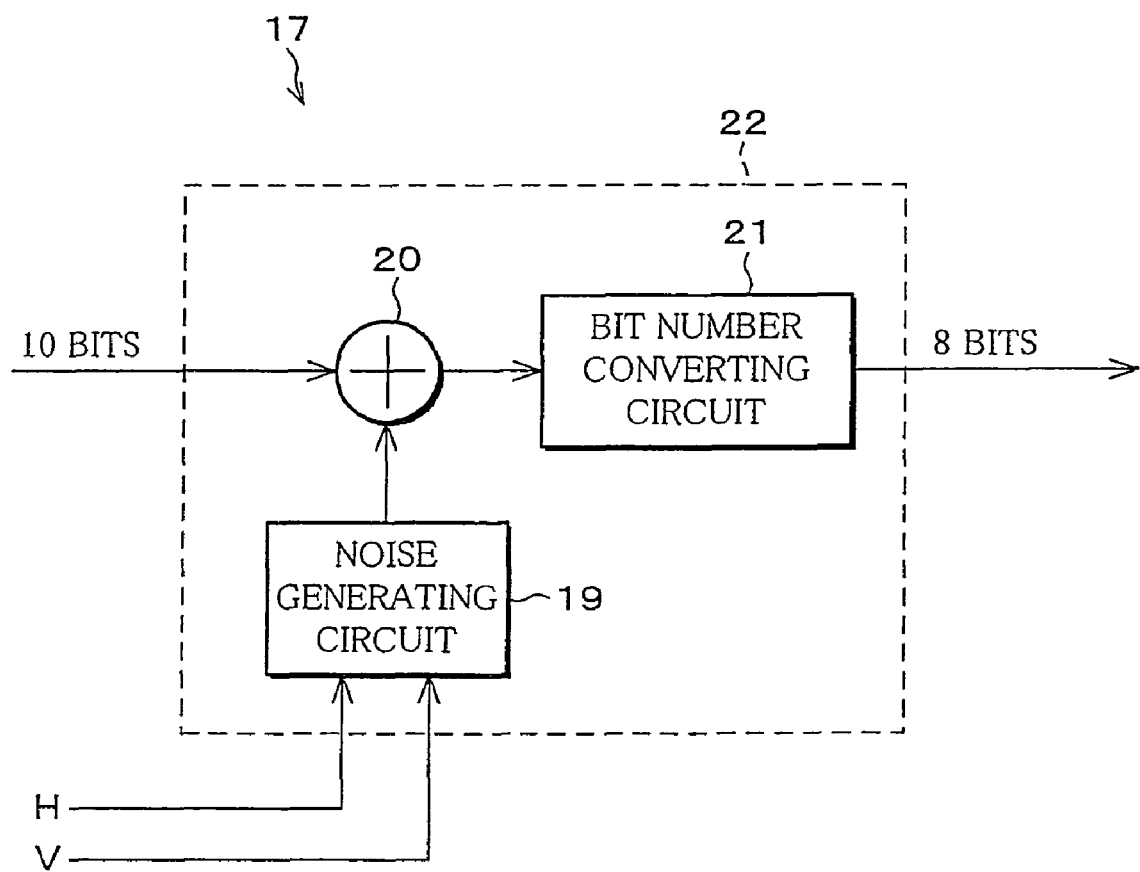
FIG. 6 is a schematic view showing a schematic structure of a second signal processing section provided in the image processing apparatus shown in FIG. 1.

As shown in FIG. 6, the second signal processing section 17 is provided with a Bit-Depth Extension (BDE) 22 that is composed of a noise generating circuit 19 for generating a noise signal to be added into an inputted digital signal, an adding circuit 20 for adding the noise into the inputted digital signal forwarded from the noise generating circuit 19, and a bit number converting circuit 21 for converting the bit number of the digital signal in which the noise signal is added. Synchronizing signals (Horizontal Synchronizing Signal H, Vertical Synchronizing Signal V), which are outputted from a synchronizing signal generating circuit (not shown), are inputted into the noise generating circuit 19.

Thus, the second signal processing section 17 converts the 10-bit digital signal, which is outputted from the first signal processing section 16, into an 8-bit digital signal by adding the noise signal and rounding down its less significant 2 bits from the 10-bit digital signal.

In the second signal processing section 17, by adding the noise signal into the digital signal for reducing the pseudo contour, it can be avoided to radically change the thickness of color of pixels adjacent to the pixels on which the image is to be displayed. Thus, the 10-bit digital signal with the noise signal addition has become a video signal with rare occurrence of the pseudo contour.

Next, the 10-bit digital signal with the rare occurrence of the pseudo contour is converted into an 8-bit digital signal after rounding down its less significant 2 bits from the 10-bit digital signal, then inputted into the display section 11 with 8-bit display properties. The 8-bit digital signal, which is inputted into the display section 11, has become a video signal without a radical change in the thickness of color of the pixels adjacent to the pixels on which the image is to be displayed. In short, it has become a video signal free from the pseudo contour generation.

Therefore, a display image of high quality with no or little pseudo contour can be achieved by inputting the 8-bit digital signal into the display means with 8-bit display properties.

The noise generating circuit 19 is provided for producing a noise signal to prevent the generation of the pseudo contour in the video signal.

The average value of the signal level of the generated noise signal is set to zero.

Figure 7:
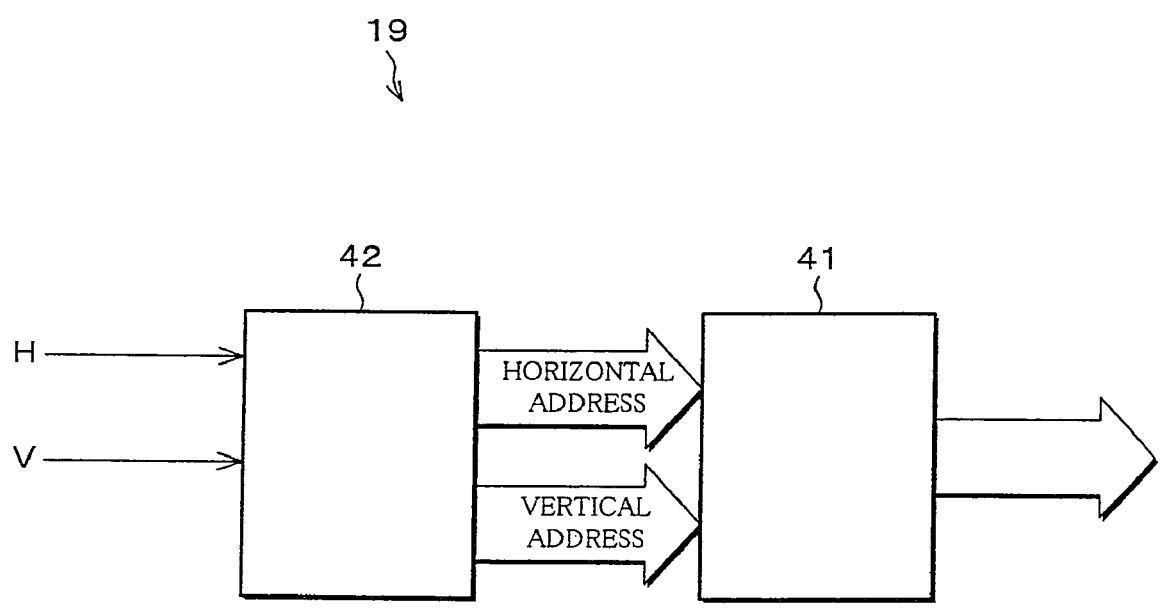
FIG. 7 is a schematic view showing a schematic structure of a noise generating circuit provided to the second signal processing section shown in FIG. 6.
Figure 10A:
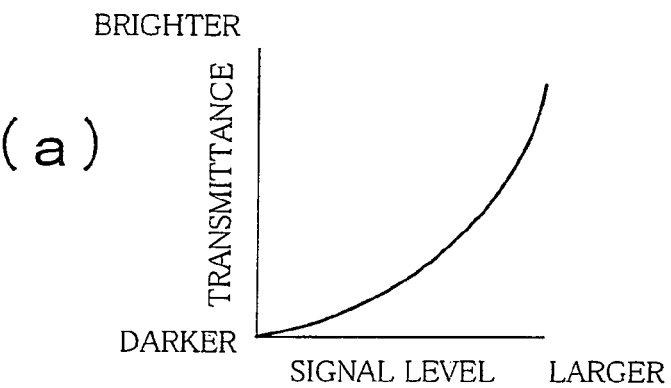
FIGS. 10 (a) to (d) are graphs showing relations between the input signal and the output signals of the signal processing section shown in FIG. 1 in case of color image display.
Figure 10B:
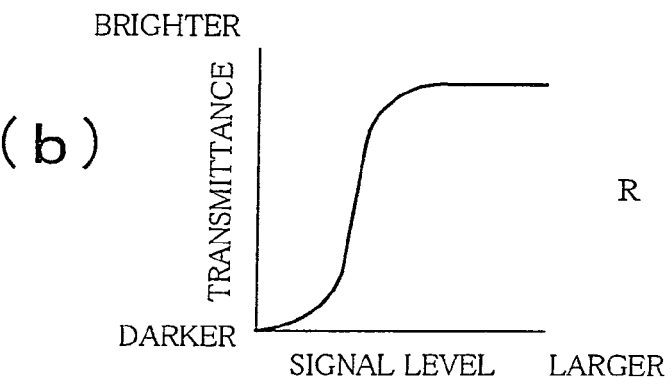
Figure 10C:
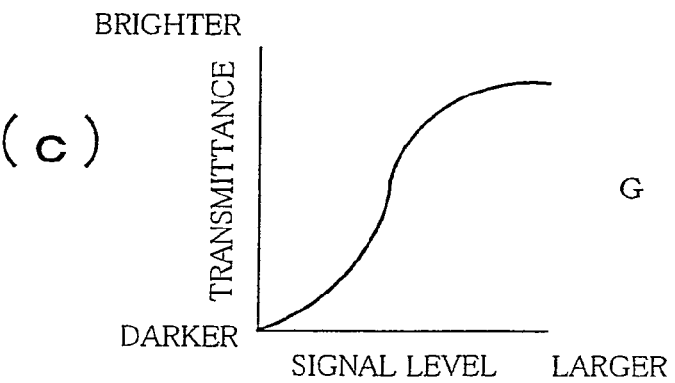
Figure 10D:
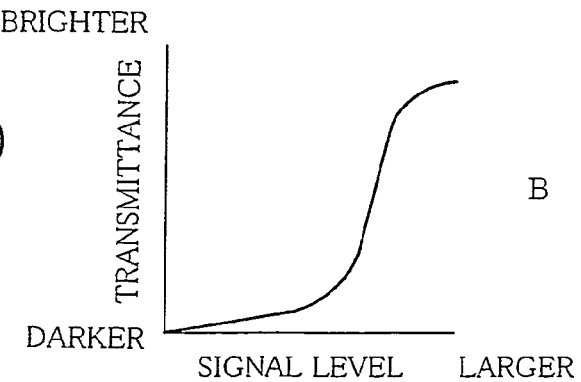

Alternatively, a noise can be generated by using a specific pattern table, as described below. The noise generating circuit 19 is composed of a noise ROM 41 and an address counter 42, as illustrated in FIG. 7. The address counter 42 has received the horizontal synchronizing signal H, the vertical synchronizing signal V, and clock (not shown).

A noise enough for one screen is stored in the noise ROM 41, while a horizontal address is incremented for each horizontal pixel, and a vertical address is incremented for each vertical line in the address counter 42, where its output is added to the noise ROM 41. As the result, a noise for one screen is consecutively supplied per pixel from the noise ROM 41. The noise is added to the video signal by the adding circuit 20 shown in FIG. 6.

The noise ROM 41 may be arranged so that the noise is stored per small block such as 16×16 or 32×32 size, instead of one screen. In this case, the address counter 42 is adapted for being reset every 16 or 32 in order that the same noise data are repeatedly outputted per block. The horizontal synchronizing signal H and the vertical synchronizing signal V, which are added to the address counter 42, are used for this purpose. In addition, a problem that periodicity is visualized will not occur even when the noise data are dealt per block such as 16 or 32, because the noise data are a random signal as explained later. The above arrangement gives such an advantage that ROM capacity of the noise ROM 41 may be significantly cut down.

Moreover, the address counter 42 may be adapted as described below. In short, the section may be adapted so that leading address is altered for each field of a screen (each vertical synchronizing signal V) or for each block border.

For example, when a noise is transformed into a 16×16 block structure, where the read-out of noise is carried out consecutively per pixel, in a first block, the read-out starts from address (0,0) of the noise ROM 41 and is continued until address (15,15). In a following block, it is designed that the read-out is performed from address (1,1) of the noise ROM 41 to address (15,15), then, through addresses (0,0) and (0,15), continued until address (1,0). In a next block, starting from address (2,2), the read-out is continued until address (15,15), then, via addresses (0,0), (0,15), (1,0) and (1,15), ends at address (2,1). The remaining will be read out in the same fashion.

In this example, the starting addresses of both of the horizontal and the vertical ones, are incremented by one address per block border, in other words, for each read-out of one block. But it is not limited to this example. For example, more than two addresses may be incremented, or either of the horizontal or the vertical one may be incremented.

Alternatively, when the leading addresses are changed per frame, where the read-out of noise is carried out consecutively per pixel, in the first frame, the read-out starts from address (0,0) of the noise ROM 41 and is continued until address (15,15). Similarly, in the following frame, the read-out is also carried out consecutively from address (0,0). The read-out in this frame is repeated consecutively in the subsequent series of read-outs. In the next frame, it is designed that the read-out, starting from address (1,1) of the noise ROM 41, is continued until address (15,15), then, through addresses (0,0) and (0,15), continued until address (1,0). The read-out in this frame is continued in this manner until the end. In the further next frame, starting from address (2,2), the read-out is continued until address (15,15), then via addresses (0,0), (0,15), (1,0) and (1,15), is ended at address (2,1). The remaining will be read out in the same manner.

In this case, as to both of the horizontal and the vertical addresses, the starting addresses are incremented by one address per frame. But it is not limited to this case. For example more than two addresses may be incremented, or either of the horizontal or the vertical may be incremented.

Discussed above are the methods for performing the read-out per block in the frame and altering the starting address, and the method for carrying out the read-out per frame and altering the starting address. However, other similar combinations may be thought of for convenience. The block border, which is originally inconspicuous, may be made further inconspicuous by altering the read-out starting address consecutively in the above manner, because the block structure of the noise, which has a block structure such as 16×16, is vanished by using this kind of read-out method.

Moreover, especially for the method in which the starting position is altered per frame, the following specific effects are produced. An LCD apparatus is generally unable to respond to a speed faster than a speed corresponding to one frame, thus cannot perfectly follow a noise changed per frame. As a result, the value obtained from the sum of a signal value and the average value of the noise is displayed per pixel. For this reason, errors, which are equivalent to those errors when all pixels are rounded down evenly, may be generated in this method, even with a process for rounding down a signal by some bits as discussed later. This means that all pixels may express all the quantization levels.

On the contrary, in the method previously explained where a noise is not altered per frame, the tone gradation is expressed in so-called the principle of area tone gradation. Therefore, when the respective pixels are considered individually, it cannot be said that all the quantization levels are expressed for the respective pixels. Thus, the method may be called as a method to express all the tone gradations on average in accordance with the size of a screen.

Accordingly, in the method in which a noise is changed per frame, all the tone gradations may be expressed per pixel. If this method is applied together with a method where leading addresses are altered per block, as described previously, it produces some properties in which the block border is inconspicuous even with little memory capacity. Furthermore, as discussed later, extra properties that are suitable for liquid crystals may also be created by devising the properties of the noise.

This prevents the accumulation of average errors in the digital signal, to which the noise signal generated by the noise generating circuit 19 is added, and eliminates the need of a special circuit for the prevention of the error accumulation.

Note that, to make zero the average value of the signal level in the generated noise signal may be easily achieved, for example, by utilizing random number generating software and algorithm by which the average of the amplitude of the signal of the generated random numbers may become zero.

The random number generating software is used for generating a random noise signal. The noise signal preferably has a low amplitude auto-correlation between adjacent pixels, and has no amplitude value of zero in its distribution range. Also, the histogram of the amplitude of the noise signal preferably shows Gaussian distribution in which the zero amplitude of the noise signal is at the center.

Therefore, the random noise signal has such characteristics that, as shown in FIG. 8, the amplitude of noise level $\Delta V$ will never exceed the upper and lower limits of the level and the average value of the level is always zero within a predetermined range (for example, one field). The histogram of noise level is, as shown in FIG. 9, regarded that it is in its most natural state when it shows the Gaussian distribution.

If the noise signal has low auto-correlation between adjacent pixels, the noise signal to be added has no periodicity but high randomness in the cycle of its amplitude. This is the point where the present invention is effective especially when used for an LCD apparatus. Dot reversing, line reversing or frame reversing drives are generally carried out in an LCD apparatus in order to perform AC drive. However, different LCDs have different reversing cycles. Thus, the cycle of reversing is not uniformed.

Those reversing drives cause killer pattern in LCDs. In a rare case, it is required to display the killer pattern, and a significant degradation in image quality will be caused. Therefore, not all images can be displayed in a satisfactory image quality. In addition, because the reversing drive is carried out based on an artificial regular cycle, the killer-pattern-affected image is likely given a regular cycle.

In a rare case, its regularity is interfered with that of the reversing drive, and an added noise signal with regular cycles of the amplitude may cause a significant image degradation. For instance, while an LCD apparatus has no such problem, other LCD apparatus may be suffered from the problem. For most of such cases, the problem is so severe that not only image quality is difficult to be improved but also the cause is hard to be found.

On the contrary, use of an irregular noise signal as the added signal like the present invention causes no interference with the regularity of the reversing drive, thus causing no image degradation. In addition, no killer pattern is produced for any LCD apparatus, thus causing no image degradation.

Moreover, several advantages are given by the noise signal with zero value of the average value of the amplitude, and explained below. In this circuit, since noise signals with different values should be added to each pixel in order to reduce the pseudo contour, it is required to change the values corresponding to the added noise signals for each pixel. But, it will be a problem that the brightness of the screen is changed for a large area. The brightness of the screen for such a large area changes by the amount corresponding to the average value of the amplitude of the noise signal when adding of the noise signal. Accordingly, the average value of the noise signal should be zero in order that the brightness may not change during the addition of the noise signal. Therefore, only the reduction of the pseudo contour is achieved by setting to zero the average value of the amplitude of the noise signal, without undesirable changes in the brightness in a large area of the screen.

Furthermore, since the noise signal has a histogram in which no zero value of the amplitude exists in the distribution range and which is the Gaussian distribution with the zero value at the center, the pseudo contour may be vanished irrespective of conditions even when a video signal is rounded down to certain bits. On the other hand, there are some cases that the zero value of the amplitude may cancel out the effect of noise signal when the value is rounded down.

Another advantage is that the noise of the display image becomes least visible when the histogram of the amplitude of the noise signal is in Gaussian distribution. On the contrary, without the Gaussian distribution, the visibility of the noise itself degrades the image quality.

Furthermore, an image processing apparatus with low cost may be provided due to the simplified structure by cutting down a memory and a feedback circuit, needed in the conventional error distribution method, for preventing the error accumulation during the addition of a noise signal into a digital signal.

The 8-bit digital signal outputted from the second signal processing section 17 is inputted into the source driver 14 of the display section 11 shown in FIG. 1. Then, after conversion of voltage into a predetermined level by the source driver 14, the digital signal is sent to a signal line in the LCD 13.

Thus, the pseudo contour due to the bit lack will be eliminated since the 8-bit video signal is inputted into the display section 11 having 8-bit display properties without the bit lack. Furthermore, the pseudo contour generated by gamma correction is also reduced by adding a noise signal during the process in order to reduce the pseudo contour. As the result, an image with high display quality is achieved.

Note that, in the LCD apparatus in the above arrangement, it is also possible to have three sets of the first signal processing section 16 and the second signal processing section 17 shown in FIG. 1 for RGB colors when color images are displayed.

For instance, when a video signal with such signal level shown in FIG. 10 (a) is inputted into the first signal processing sections 16, the LUTs 18 provided for the respective RGB colors in the first signal processing sections 16 give signals in accordance with the respective RGB colors as shown in FIG. 10 (b) to FIG. 10 (d). The LUTs 18 may be adapted to carry out the gamma correction so that, when the input signal is an 8-bit signal, the output signal is a 10-bit signal, just like the case described previously. It is expected that there are some differences among the properties of the respective RGB colors.

In this case, the gamma-corrected output signals of the respective RGB colors are inputted into the second signal processing sections 17, and outputted as 8-bit signals into the display sections 11 after the bit conversion process.

Moreover, because the display quality of the LCD apparatus is adjustable by the image processing apparatus 12, the image processing apparatus 12 and the display sections 11 may be separately provided. In this case, even with some differences among the display sections 11, because the display quality can be adjusted properly by the image processing apparatus 12, any types of display sections 11 may be used for achieving an image of high display quality.

For example, when the LCD apparatus having the above arrangement is adapted to a display apparatus such as a personal computer (PC) which controls the display by a video card, this may improve the image quality by using an existing PC with a low-cost video card only, but not by using an expensive video card, because the high quality image is achieved not by the video card but by the image processing apparatus 12 provided to the LCD apparatus.

By the way, the LUT 18 included in the image processing apparatus 12 having the above arrangement, as described above, is arranged in accordance with the display properties of the display section 11. But, it is also possible that the LUT 18 is adapted to use a present value or to be rewritable in real time as described below.

Described below is the explanation on the method of rewriting the LUT 18, giving concrete examples of the LUT 18 rewriting methods.

1. rewriting in accordance with the display properties (V-T curve) of the LCD.

2. rewriting so as to absorb the unevenness between the respective ICs (source).

3. rewriting the bit distribution in accordance with the brightness in surroundings.

4. rewriting the bit distribution in accordance with the average level of an input signal.

5. preparing three LUTs 18 for the respective RGB colors, and rewriting them with adjustment for the respective colors.

Figure 11:
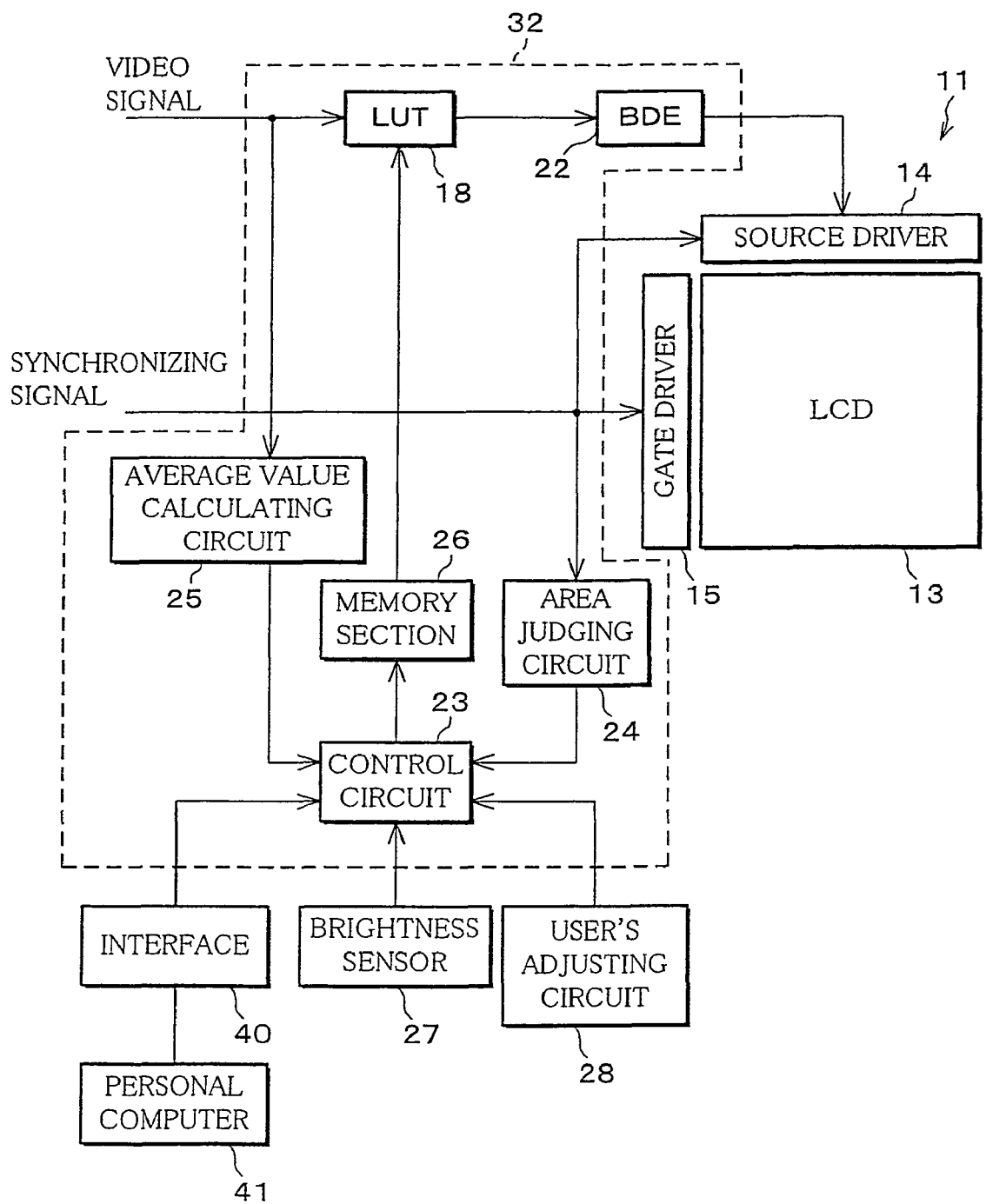
FIG. 11 is a schematic diagram showing an image display apparatus for showing connection formation of respective circuits for rewriting a value of the LUT of the image processing apparatus of the present invention.

The apparatus for realizing the above methods is something like an image display apparatus shown in FIG. 11. Note that, identical members with the ones used in the previous explanation are assigned, thus their explanation is omitted here.

The image display apparatus mentioned above is provided with, as shown in FIG. 11, a display section 11 and an image processing apparatus 32 that includes an LUT 18, a BDE 22, a control circuit 23, an area judging circuit 24, an average value calculating circuit 25 and a memory section 26. The display section 11 has the same arrangement as the image display apparatus shown in FIG. 1.

The area judging circuit 24 is adapted to receive a synchronizing signal identical with the one inputted into the source driver 14 and the gate driver 15, and to judge the area to be displayed on the LCD 13. Then, the area judging circuit 24 is adapted to output the judged area information to the control circuit 23.

The average value calculating circuit 25 is adapted to receive a video signal identical with the one inputted into the LUT 18, and to calculate the average value of the brightness included in the video signal. Then, the average value calculating circuit 25 is adapted to output the calculated value to the control circuit 23.

Moreover, the image display apparatus is provided with a brightness sensor 27 for detecting the brightness in the surroundings of the image display apparatus and a user's adjusting circuit 28 for allowing a user to alter the LUT 18. Signals from the respective sensor and circuit are inputted into the control circuit 23.

Furthermore, a signal can be inputted from a PC 41 through an interface 40. In this case, it is an advantage that a user is allowed to give instructions from the PC 41.

As described, the control circuit 23 in the image processing apparatus 32 is adapted to receive signals from the area judging circuit 24, the average value calculating circuit 25, the brightness sensor 27, the user's adjusting circuit 28, and the interface 40, and to calculate the LUT 18 separately based on the respective signals. The calculated value is outputted to the memory section 26 connected with the control circuit 23. Note that, each input may include all of or only part of them.

The memory section 26 is provided with a ROM and a RAM. Written in advance in the ROM is a value for correcting the V-T curve of the LCD 13 in accordance with the display properties of the display section 11, because current data cannot be written into the ROM. The RAM is adapted for storing the value from the control circuit 23 since it is data rewritable.

If necessary, the stored value for rewriting the LUT 18 is outputted as the LUT 18 from the memory section 26 by the control circuit 23. This makes the LUT 18 rewritable in various conditions.

The high quality of display image is always maintained by rewriting the LUT 18 in accordance with the various conditions as explained above.

Described below is the explanation about the rewriting method of the LUT 18 for cancelling out the unevenness among the respective ICs, with reference to FIG. 11 and FIG. 12.

As shown in FIG. 12, the source driver 14 is composed of a plurality of source driving ICs 29, while the gate driver 15 includes a plurality of gate driving ICs 30.

The source driving ICs 29 are connected with a predetermined number of source signal lines (not shown) of the LCD 13, while the gate driving ICs 30 are connected with a predetermined number of gate signal lines (not shown) of the LCD 13. For instance, when the LCD 13 has 800×600 resolution and is provided with eight of the source driving ICs 29 and six of the gate driving ICs 30, the number of source signal lines connected to one source driving IC 29 is one hundred, while the number of gate signal lines connected to one gate driving IC 30 is also one hundred.

Further, a synchronizing signal is inputted into the source driving ICs 29 and the gate driving ICs 30. Hence, detected by the synchronizing signal is the area surrounded with the respective source driving ICs 29 and gate driving ICs 30, in other words, an area 13a surrounded with 100×100 signal lines.

Those areas are driven by specific driving ICs, and have a problem that unevenness in the properties of driving ICs cause, for example, perceptible differences in luminance among the respective areas. The differences in luminance among the respective blocks, in a sense, are equivalent to the pseudo contour discussed in the present invention. Therefore, the unevenness in screen display properties, which are originally due to the unevenness in the driving ICs, may be reduced by using the present invention that is effective to suppress the pseudo contour. Moreover, the unevenness in the properties of the respective areas can be completely suppressed in such an arrangement that the unevenness in the properties of the respective areas 13a of the LCD 13 are detected in advance.

In the areas 13a detected by using a synchronizing signal as described above, the display properties are checked in advance by a shipping-check apparatus, in order to detect the unevenness in the properties of the driving ICs (the source driving ICs 29 and the gate driving ICs 30). The unevenness in the driving ICs is stored in the memory section 26. Then, the LUT 18 is rewritten so that the unevenness in the drive ICs is absorbed. This absorbs the unevenness in the display properties among the respective display areas generated in the display section 11, thus absorbing the unevenness in the display properties of the respective display sections 11. Thus, the unevenness between each image display apparatus can be eliminated.

In practice, written into the LUT 18 is a value in accordance with the properties of the source driving ICs 29 corresponding to the area of the display section 11, the area being judged by the area judging circuit 24. In this case, the LUT 18 is consecutively rewritten in time series since the video signal is inputted in time series into the source operative ICs 29. The display quality of the display image of the display section 11 is improved by consecutively rewriting the LUT 18 in this manner.

Note that, it is also possibly arranged that the LUTs 18 are provided in the number as many as the source driving ICs 29, and values in accordance with the respective source driving ICs 29 are written into the LUTs 18 in advance. In this case, it is also possible to provide the LUTs 18 themselves in the source driving ICs 29.

Moreover, the display image differently comes in sight depending on the surroundings during the image displaying. In this case, the LUT 18 may be rewritten so that, when, for example the image display apparatus is placed in a room, the surroundings of the image display apparatus are bright, the tone gradation of the bright part of the image displayed on the display section 11 is made to be high, and when the surroundings are dark, the tone gradation of the dark part of the image displayed on the display section 11 is made to be high. In other words, the LUT 18 may be rewritten so that the bit distribution of the display image is rewritten in accordance with the brightness in the surroundings of the image display apparatus.

In practice, it may be arranged that the brightness in the surroundings in which the image display apparatus is placed is detected by utilizing the brightness sensor 27. Then, in accordance with the detection signal, the control circuit 13 sets a suitable value and then rewrites the LUT 18 via the memory section 26.

As described above, the image displayed on the display section 11 may become more easy to watch by rewriting the LUT 18 in accordance with the brightness of the surroundings in which the image display apparatus is located.

Moreover, the display image also becomes hard to watch in case of an overall dark image or an overall bright image, regardless of the surroundings of the image display apparatus. In order to solve this, it may be arranged that the average value of the signal level of the inputted video signal is calculated and the LUT 18 may be rewritten so that the bit distribution of the display image is rewritten to the average value.

In practice, the procedures are as follows: the average value of the signal level of the video signal is calculated by the average value calculating circuit 25. The control circuit 23 sets a suitable value in accordance with the average value and rewrites the LUT 18 via the memory section 26. In other words, the LUT 18 may be rewritten so that the bit distribution is rewritten in accordance with the average value of the signal level of the video signal that is an inputted signal.

Furthermore, in case of the color display image as described previously, three units of the LUTs 18, which are data rewritable in real time in accordance with various conditions as described above, may be provided for the respective RGB colors, and are adjusted to the respective colors for rewriting.

Note that, the example in the present embodiment is that an 8-bit digital signal is expanded to 10 bits and converted back to 8 bits again. However, the present invention is not limited to the foregoing, and it may be applied to, for example, where a 10-bit signal is displayed on a display of 10-bit display properties, or where a 4-bit signal is displayed on a display of 4-bit display properties, which is generally used in game machines or portable phones.

As discussed earlier, the image processing apparatus of the present invention is utilized for an image display apparatus provided with display means of n-bit (n: a natural number) display properties for displaying an image, upon receipt of a digital signal as a video signal, in accordance with the digital signal. The image processing apparatus is provided with a first signal processing circuit and a second signal processing circuit. The first signal processing circuit carries out gamma correction for an n-bit digital signal inputted as the video signal, and converts the digital signal into an m-bit (m>n, m: a natural number) digital signal. The second signal processing circuit adds a noise signal for reducing pseudo contour, to the m-bit digital signal from the first signal processing circuit, then outputs a Q-bit (Q: a natural number) digital signal, which is obtained by rounding down a less significant (m−Q) bit (Q≦n) from the m-bit digital signal, to the above display means.

Accordingly, a display image of high quality with little or no occurrence of the pseudo contour may be achieved by inputting an n-bit digital signal into display means with display properties of bit number less than or equal to n bit.

The image processing apparatus of the present invention is provided with a signal processing circuit for outputting the Q-bit digital signal, which is obtained by rounding down the less significant (m−Q) bit (Q<m, m & Q are natural numbers) from the m-bit digital signal after adding the noise signal for the reduction of the pseudo contour into the inputted an m-bit digital signal.

Therefore, it is not simply to omit the less significant (m−Q) bit, but to achieve the expression of the display properties equivalent to m bit in a pseudo manner by using a Q-bit digital signal.

The noise is produced so that the average value of the signal level of the noise signal to be added into the m-bit digital signal is set to zero.

Accumulation of errors of signals caused by the noise signal addition will not be resulted from adding a noise signal produced as explained above into the digital signal in a random manner.

This may simplify the apparatus, thus offers a low-cost image processing apparatus because means such as a memory and a feedback circuit are no longer necessary, which are needed in the conventional error diffusion method for preventing the accumulation of errors when a noise signal is added into a digital signal. In addition, it is also possible to include the entire circuit in the source driving IC for greater economic effects.

The noise signal may have randomness with no regularity in the cycle of the amplitude.

In this case, because no regularity of the cycle of the amplitude of the noise signal interferes with the regularity of reversing drives in case that an LCD apparatus is used as the image display apparatus, the display quality of the display image may be improved, accordingly.

The noise signal may, using an arbitrary noise pattern table, be obtained by switching the starting point of the noise pattern table per field or per noise pattern table.

In this case, because the noise level is evenly rounded down by switching the starting point of the noise pattern table per field, all pixels are allowed to express all the values of the quantization levels.

Moreover, the quantization levels may be averaged per noise pattern table by switching the starting point of the noise pattern table per noise pattern table.

In an LCD apparatus, dot reversing, line reversing, or frame reversing drives are generally carried out for AC drive, but the cycle of the reversion is different for every LCD apparatus and is not uniformed. Due to this reversing drive, a killer pattern may exist in case there is regularity in the cycle of the amplitude of the noise signal. In a rare case where the killer pattern is displayed, a significant degradation in image quality is caused. However, if there is no regularity in the cycle of the amplitude of the noise signal, as described above, a killer pattern will never exist and cause no degradation in image quality.

The histogram of the noise signal may be in Gaussian distribution where the zero value of the noise signal is set at the center.

In this case, because the histogram of the amplitude of the noise signal is in the Gaussian distribution, the noise becomes least visible, as the result, the display quality of the display image can be improved.

The first signal processing circuit may be provided with bit converting means for converting the inputted n-bit digital signal into the m-bit digital signal in accordance with a value set in advance.

In this case, the display quality of the display image can be further improved by setting the value to be set in the bit converting means, considering various conditions such as the display properties of the display means or the environment surrounding the image display apparatus.

For example, the value set in the bit converting means may be rewritten so as to absorb the unevenness in the properties of the drive means for driving the display means.

In this case, the unevenness among individual display means need not be considered so strictly, because the unevenness in the display properties generated for every display means can be absorbed. As the result, the overall yield of the image display apparatus is improved, thus significantly reducing the manufacturing cost of the image display apparatus.

Besides, the value thus set by the bit converting means may be rewritten in accordance with the brightness in the surroundings of the image display apparatus.

In this case, the image can be displayed in high quality all the time, regardless of the brightness of the surroundings of the image display apparatus, by rewriting the value so that the tone gradation of dark parts of the display image is made to be high when the surroundings of the image display apparatus are dark, while, when the surroundings of the image display apparatus are bright, by rewriting the value so as to make that of bright part to be high.

Furthermore, the value set by the bit converting means may be rewritten in accordance with the display properties of an image displayed on the display means.

In this case, the image can be displayed in high quality all the time, regardless of the brightness of the image displayed on the image display apparatus, by rewriting the value so as to make the tone gradation of dark parts of the display image to be high when the entire display image is dark, while, when the entire display image is bright, by rewriting the value so as to make that of bright part to be high.

The bit converting means may be realized by an LUT for replacing the inputted signal with corresponding output value set in advance.

In this case, the process in the bit converting means may be promptly carried out because the output value varying depending on with the inputted value is set in advance in the LUT. Additionally, the entire arrangement of the image processing apparatus may be streamlined by simplifying the structure of the bit converting means.

Also, the bit converting means may be realized by a calculating device for converting an n-bit digital signal into an m-bit (m>n) digital signal by numerical calculation.

In this case, the calculating device can be a Central Processing Unit (a CPU) or a Digital Signal Processor (a DSP).

Those CPU and DSP, which are programmable devices, have an advantage to facilitate user interface for rewriting the value of the bit converting means, thus making the operation easier.

When a color image is displayed on the image display apparatus, the respective RGB colors may be provided with the first signal processing circuit and the second signal processing circuit.

Furthermore, the image display apparatus may be provided with the image processing apparatus of the above arrangement.

In this case, the process of the signal inputted into the display section of the image display apparatus is carried out in the image processing apparatus. This eliminates the need of an expensive apparatus for improving the display quality of the display section, thus provides the image display apparatus of high quality in a low cost.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:
a first signal processing circuit for converting an n-bit (n: a natural number) digital signal inputted as a video signal, into an m-bit (m>n, m: a natural number) digital signal, the n-bit digital signal expressing a tone gradation of $2^n$, and the m-bit digital signal expressing a tone gradation of $2^m$; and
a second signal processing circuit having an address counter that is incremented by a horizontal synchronizing signal and a vertical synchronizing signal, the second signal processing circuit for (i) adding a noise signal to the m-bit digital signal converted by the first signal processing circuit, (ii) rounding down a less significant (m−Q) bit (Q<n, Q: a natural number) from the m-bit digital signal having added thereto the noise signal, and (iii) outputting the resulting Q-bit digital signal,
the first signal processing circuit including at least one look-up table for converting the inputted n-bit digital signal to the m-bit digital signal,
the first signal processing circuit converting the n-bit digital signal expressing the tone gradation of $2^n$ to the m-bit digital signal expressing the tone gradation of $2^m$, by changing between, per display region, a plurality of look-up tables in which various values are entered in advance,
wherein the noise signal is added to the video signal based on a value of the address counter.

2. The image processing apparatus as set forth in claim 1, wherein:
an average value of a signal level of the noise signal is set to zero.

3. The image processing apparatus as set forth in claim 1, wherein:
the noise signal is a random noise signal with no regularity in its cycle of amplitude.

4. The image processing apparatus as set forth in claim 1, wherein:
the noise signal is stored in a noise memory, the noise memory storing the noise signal for one screen.

5. The image processing apparatus as set forth in claim 1, wherein:
the noise signal is stored in a noise memory, the noise memory storing the noise signal per block units smaller than one screen.

6. The image processing apparatus as set forth in claim 5, wherein:
the noise signal is a signal generated by using an arbitrary noise pattern table and altering a starting point of the noise pattern for each of the block units.

7. The image processing apparatus as set forth in claim 1, wherein:
a histogram of an amplitude of the noise signal shows Gaussian distribution where zero amplitude of the noise signal is at the center.

8. An image processing apparatus comprising:
a first signal processing circuit for converting an n-bit (n: a natural number) digital signal inputted as a video signal, into an m-bit (m>n, m: a natural number) digital signal, the n-bit digital signal expressing a tone gradation of $2^n$, and the m-bit digital signal expressing a tone gradation of $2^m$; and
a second signal processing circuit having an address counter that is incremented by a horizontal synchronizing signal and a vertical synchronizing signal, the second signal processing circuit for (i) adding a noise signal to the m-bit digital signal converted by the first signal processing circuit, (ii) rounding down a less significant (m−Q) bit (Q<=n, Q: a natural number) from the m-bit digital signal having added thereto the noise signal, and (iii) outputting the resulting Q-bit digital signal,
the first signal processing circuit including at least one look-up table for converting the inputted n-bit digital signal to the m-bit digital signal,
the first signal processing circuit converting the n-bit digital signal expressing the tone gradation of $2^n$ to the m-bit digital signal expressing the tone gradation of $2^m$, by rewriting, per display region, values in the look up table,
wherein the noise signal is added to the video signal based on a value of the address counter.

* * * * *